(12) United States Patent
Weber et al.

(10) Patent No.: US 7,855,041 B2
(45) Date of Patent: Dec. 21, 2010

(54) PIGMENT PREPARATION BASED ON AN AZO PIGMENT

(75) Inventors: Joachim Weber, Reinach (CH); Patrick Hoetzel, Mainz (DE); Karl-Heinz Schweikart, Eschborn (DE); Frank Alfter, Bad Soden (DE)

(73) Assignee: Clariant Produkte (Deutschland) GmbH, Frankfurt (DE)

( * ) Notice: Subject to any disclaimer, the term of this patent is extended or adjusted under 35 U.S.C. 154(b) by 177 days.

(21) Appl. No.: 11/919,662

(22) PCT Filed: Apr. 20, 2006

(86) PCT No.: PCT/EP2006/003626

§ 371 (c)(1),
(2), (4) Date: Dec. 9, 2008

(87) PCT Pub. No.: WO2006/119847

PCT Pub. Date: Nov. 16, 2006

(65) Prior Publication Data

US 2009/0305156 A1    Dec. 10, 2009

(30) Foreign Application Priority Data

May 6, 2005    (DE) ........................ 10 2005 021 160

(51) Int. Cl.
G03G 9/09    (2006.01)
C09B 27/00    (2006.01)
C09D 11/02    (2006.01)
G02C 7/10    (2006.01)

(52) U.S. Cl. ............................... 430/108.23; 106/31.77; 106/496; 252/582

(58) Field of Classification Search ............ 430/108.23; 106/31.77, 496; 252/582
See application file for complete search history.

(56) References Cited

U.S. PATENT DOCUMENTS

| | | | |
|---|---|---|---|
| 4,461,647 | A | 7/1984 | Schofield et al. |
| 5,910,577 | A | 6/1999 | Metz et al. |
| 6,835,242 | B2 | 12/2004 | Nickel et al. |
| 7,285,592 | B2 | 10/2007 | Harz et al. |
| 7,311,769 | B2 | 12/2007 | Weber et al. |
| 2003/0164118 | A1 | 9/2003 | Nickel et al. |
| 2004/0171738 | A1 | 9/2004 | Harz et al. |

FOREIGN PATENT DOCUMENTS

| | | |
|---|---|---|
| EP | 0076024 | 4/1983 |
| EP | 894831 | 2/1999 |
| EP | 1167461 | 1/2002 |
| EP | 1411091 | 4/2004 |
| GB | 2364322 | 1/2002 |
| WO | WO 03/008510 | 1/2003 |
| WO | WO 03/052000 | 6/2003 |
| WO | WO 2004/029167 | 4/2004 |
| WO | WO 2004/094534 | 11/2004 |
| WO | WO 2005/028564 | 3/2005 |
| WO | WO 2005/037729 | 4/2005 |

OTHER PUBLICATIONS

Co-pending U.S. Appl. No. 11/919,661, filed Oct. 30, 2007 by Weber et al.
PCT International Search Report for PCT/EP2006/003626, mailed Nov. 14, 2006.
English Transaction of PCT IPER for PCT/EP2006/003626, mailed Dec. 13, 2007.

Primary Examiner—Hoa V Le
(74) Attorney, Agent, or Firm—Anthony A. Bisulca

(57) ABSTRACT

The invention relates to a pigment preparation which contains the monoazo pigment of the formula (I)

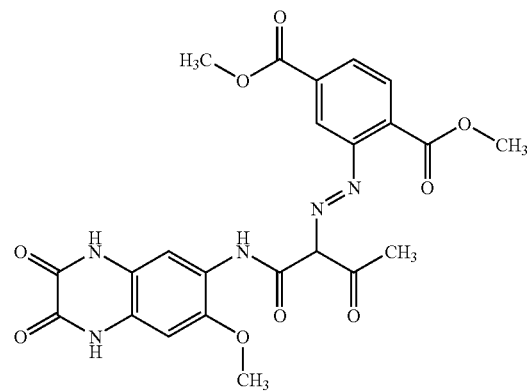

and 0.1% to 40%, preferably 0.5% to 25%, in particular 1.0% to 17.5% of a pigment dispersant, in relation to the weight of the monoazo pigment of the formula (I), which is composed of disazo compounds at least 30% of the diazo compounds forming an asymmetric disazo compound of the formula (II)

Y-X-A-X-Z    (II), in which
A is biphenylene, 3,3'-dichlorobiphenylene, 3,3'-dimethoxybiphenylene, 3,3'-dimethylbiphenylene or 2,2'-dichloro-3,3'-dimethoxybiphenylene;
X is a group —NH—CO—CH(COCH$_3$)—N=N—, —N=N—CH(COCH$_3$)—CO—NH— or —N=N—;
Y is substituted or unsubstituted phenyl, pyrazolin-5-on-4-yl, 1-phenyl-Pyrazolin -5-on-4-Lyl, 2-hydroxynaphth-1-yl or 2-hydroxy-3-(phenylamino-carbonyl) naphth-1-yl, the substituents being $C_1$-$C_4$ alkyl, $C_1$-$C_4$ alkoxy, nitro, halogen or $C_1$-$C_4$ alkoxycarbonyl, and have the meaning of Y, and the compounds being further substituted with a sulfonic acid group present as an ammonium salt. Y stands for substituted or unsubstituted phenyl, pyrazolin-5-on-4-yl, 1-phenyl-pyrazolin-5-on-4-yl, 2-hydroxynaphth-1-yl or 2-hydroxy-3-(phenylaminocarbonyl)naphth-1-yl, the substituents being $C_1$-$C_4$-alkyl, $C_1$-$C_4$-alkoxy, nitro, halogen or $C_1$-$C_4$-alkoxycarbonyl and having the meaning of Y, and the compounds being further substituted with a sulphonic acid group present as an ammonium salt.

13 Claims, No Drawings

PIGMENT PREPARATION BASED ON AN AZO PIGMENT

The invention relates to a pigment preparation comprising a monoazo pigment and a pigment dispersant based on a disazo compound, and to a process for its production.

Pigment preparations are combinations of base pigments and what are called pigment dispersants, i.e., pigments substituted with groups having specific activity. The pigment dispersants are added to the pigments in order to facilitate their dispersion in the application media, more particularly in paints and printing inks, and in order to enhance the rheological and coloristic properties of the pigments.

Pigments used for coloring high molecular mass organic materials are subjected to stringent requirements with regard to their performance properties, such as high color strengths, ready dispersibility, high chroma and cleanness of hue, and good light fastness and weather fastness. Universal utility for coloring plastics and also for coloring both solvent-based and aqueous paints and printing inks is desirable. In both paints and printing inks there is a trend toward high pigment concentrations in the grind, which is why highly pigmented paint and printing-ink concentrates or millbases with nonetheless low viscosity are called for; similarly, the viscosity of the completed paint or printing ink has to be suitable for the planned application. Printing inks are desired to have a high transparency, while paint systems are desired to have impeccable overcoating fastnesses and solvent fastnesses, resistance to alkali and acid, and, in the case of metallic paint systems in particular, high transparency and brilliant hues. In the case of plastics coloration, the requirements include high bleed fastness, heat stability, and good dispersibility, as is manifested, for example, in high color strengths. Again, universal utility in various systems, such as in aqueous and solvent-based systems, is also desired.

Examples of further fields of use for pigments include electrophotographic toners and developers, liquid inks such as inkjet inks or e-inks, for example, color filters, or powder coatings, which each have their additional specific requirements.

With color filters a full-color image is produced by red, green, and blue image points using transmitted light. As well as the transmissive (or nonemissive) color filters (i.e., those using transmitted light) there are also reflective color filters, which are then able to work where appropriate with yellow, cyan, and magenta image points as well.

Among the color filters a distinction is made between AM (active matrix) and PM (passive matrix) LCD (liquid crystal display) color filters, with the TFT (thin film transistor) LCD color filters being accorded a particular significance. Color filters can also be employed, furthermore, with MEMS (DMD) (micro-electromechanical systems, digital micro mirror devices), with e-paper, and also with further suitable display technologies.

Color filter displays find application in a very wide variety of electrooptical systems, as for example in screens of desktop monitors, in computer screens, screens of portable computers (laptops), PDAs (personal digital assistants), and also in cellphone monitors, video camera monitors, GPS (global positioning systems) monitors, and other monitors, and additionally, generally, in liquid-crystal devices and charge-coupled devices, in plasma displays or in electroluminescent and other displays. The last-mentioned displays may be, for example, active (twisted nematic) or passive (supertwisted nematic) ferroelectric displays, or light-emitting diodes, for example.

Color filters find use, moreover, in flat panel displays (flat screens), which are increasingly replacing the conventional cathode ray television screens, or which may be utilized, generally, as display panels in any desired size for fixed and moving information.

A typical LCD color filter construction may be described schematically as follows: between two glass plates there is located a thin layer with liquid crystals. Besides a number of other functional components, the upper glass plate has on its outer surface the corresponding image points, e.g., red, green, and blue (R, G, B). These image points are outlined in black for better contrast; to the outside, the R, G, B image points are protected by a suitable protective coat against environmental effects, such as scratches. The lower glass plate also contains further functional components such as, for example, ITO (indium tin oxide) and TFT (thin film transistors), which serve among other things to drive the individual image points.

If suitable light (e.g., linearly polarized light of a defined wavelength) is passed through the lower glass plate, the liquid crystal can then be driven electronically and thereby set to "light" or "dark" (or to any stage in between).

Correspondingly, the color filter image points are supplied with light and a corresponding colored image, fixed or moving, based on R, G, B, is produced to the human eye.

EP-A-0 894 831 discloses quinoxaline monoazo-acetarylide pigments, including the monoazo pigment in the formula (I), and a process for its preparation.

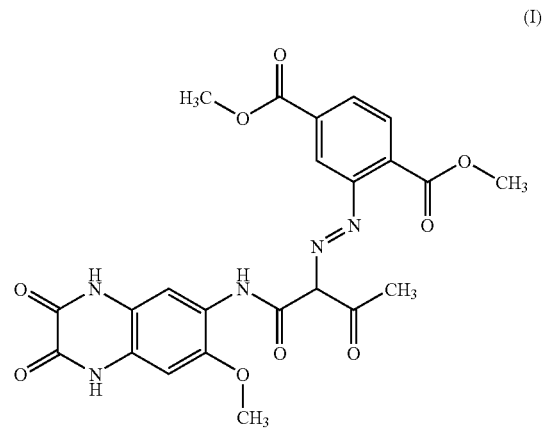

(I)

The performance properties of the disclosed monoazo pigment in the formula (I) no longer satisfy the present-day requirements in all respects. EP-A-0 076 024 discloses disazo compounds which serve for liquefying pigment dispersions in nonaqueous systems.

WO 2004/029167 A1 discloses pigment preparations which comprise the compounds disclosed in EP-A-0 076 024.

There was a need for a yellow monoazo pigment that overcomes the disadvantages of the monoazo pigments disclosed in EP-A-0 894 831 and which satisfies the abovementioned requirements in the various application media.

It has been found that a pigment preparation comprising the monoazo pigment of the formula (I) and a specific pigment dispersant composed of disazo compounds significantly improves, surprisingly, the performance properties of the monoazo pigment of the formula (I).

The invention provides a pigment preparation comprising the monoazo pigment of the formula (I)

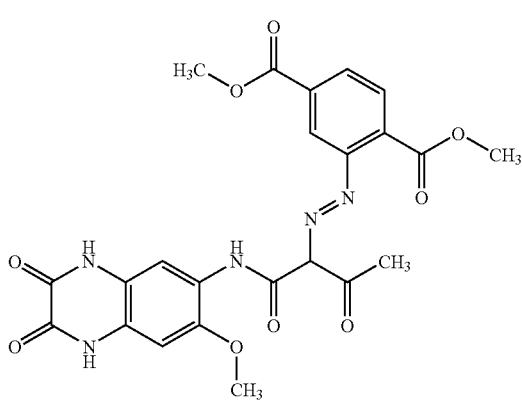

(I)

and a pigment dispersant in an amount of 0.1% to 40%, preferably 0.5% to 25%, more particularly 1.0% to 17.5% by weight, based on the weight of the monoazo pigment of the formula (I), which is composed of disazo compounds, at least 30% by weight of the disazo compounds constituting an asymmetric disazo compound of the formula (II)

Y-X-A-X-Z (II), in which

A is biphenylene, 3,3'-dichlorobiphenylene, 3,3'-dimethoxybiphenylene, 3,3'-dimethylbiphenylene or 2,2'-dichloro-3,3'-dimethoxybiphenylene;

X is a group —NH—CO—CH(COCH$_3$)—N=N—, —N=N—CH(COCH$_3$)—CO—NH— or —N=N—;

Y is substituted or unsubstituted phenyl, pyrazolin-5-on-4-yl, 1-phenyl-pyrazolin-5-on-4-yl, 2-hydroxynaphth-1-yl or 2-hydroxy-3-(phenylamino-carbonyl)naphth-1-yl, the substituents being $C_1$-$C_4$ alkyl, $C_1$-$C_4$ alkoxy, nitro, halogen or $C_1$-$C_4$ alkoxycarbonyl, and Z has the definition of Y and is additionally substituted by a sulfonic acid group present in the form of the ammonium salt.

The monoazo pigment of the formula (I) can be prepared with the process described in EP-A-0 894 831.

The pigment dispersants composed of disazo compounds are known compounds and are described in EP-A-0 076 024.

They are typically prepared by a corresponding co-coupling operation. The pigment dispersant therefore commonly comprises a mixture of disazo compounds of the formulae Y-X-A-X-Z and Y-X-A-X-Y and Z-X-A-X-Z with the asymmetric compound Y-X-A-X-Z accounting for preferably at least 35%, more particularly 40% to 60%, and with particular preference 50% to 60% by weight.

Preference is given to using pigment dispersants in which the central divalent group A derives from dichlorobenzidine.

Preference is given to using pigment dispersants in which the monovalent end group X-Y derives from acetoacetanilide, and in which the acidically substituted end group X-Z derives from acetoacet-4-sulfanilide.

The ammonium salt is formed preferably by a quaternary ammonium ion which possesses at least one linear saturated hydrocarbon chain having more than 6 carbon atoms, more particularly two linear saturated hydrocarbon chains each having more than 12 carbon atoms, such as for example stearylbenzyl- or cocoalkyl-dimethyl-benzylammonium or -2,4-dichlorobenzylammonium, hexadecyl-, stearyl-, dodecyl-, octadecyl- or cetyltrimethylammonium, dihydrogenated tallow alkyl-, dicocoalkyl-, dioctadecyl- or distearyldimethyl-ammonium, oleyl- or coco-di(2-hydroxyethyl)methylammonium, hydrogenated polyoxyethylene(15)tallowmethylammonium, N,N,N',N',N'-pentamethyl-N-tallow-1,3-propanediammonium, permethylated N-stearyldiethylenetriamine, permethylated N-stearyltriethylenetetramine, N-(3-dodecyloxy-2-hydroxy-propyl)octadecyldimethylammonium, methyltri(2-octyl)ammonium, N,N-di(beta-stearoylethyl)-N,N-dimethylammonium, laurylpyridinium, 2-hydroxy[5-chloro-, 5-isooctyl-, 5-tert-butyl- or n-nonyl-]1,3-xylylenebispyridinium, 2-methoxy-5-iso-octyl-1,3-xylylenebispyridinium, 2-hydroxy-5-isooctyl-1,3-xylylenebisquinolinium, 2-hydroxy-5-isooctyl-1,3-xylylenebisisoquinolinium or behenyltrimethylammonium, more particularly stearylbenzyl- or cocoalkyl-dimethyl-benzylammonium, stearyl-, octadecyl- or cetyltrimethylammonium, dihydrogenated tallow alkyl-, dicocoalkyl-, dioctadecyl- or distearyldimethylammonium or oleyl-di(2-hydroxyethyl)methyl-ammonium.

Particular preference is given to pigment dispersants in which the compound of the formula (II) corresponds to the formula (IIa)

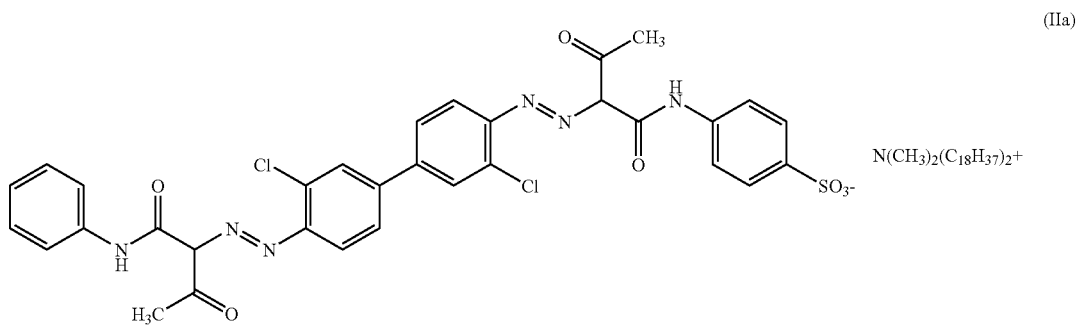

(IIa)

Besides the monoazo pigment of the formula (I) and the pigment dispersant, the pigment preparations of the invention may comprise further, customary auxiliaries or additives, such as, for example, surfactants, nonpigmentary and pigmentary dispersants, fillers, standardizers, resins, waxes, defoamers, antidust agents, extenders, antistatics, shading colorants, preservatives, drying retardants, rheology control additives, wetting agents, antioxidants, UV absorbers, and light stabilizers, biocides, or a combination of these, preferably in an amount of 0.1% to 25% by weight, in particular 0.5% to 15% by weight, based on the total weight of the pigment preparation.

Suitable surfactants include anionic, or anion-active, cationic, or cation-active, and nonionic or amphoteric substances, or mixtures of these agents.

Examples of suitable anionic substances include fatty acid taurides, fatty acid N-methyltaurides, fatty acid isethionates, alkylphenylsulfonates, an example being dodecylbenzenesulfonic acid, alkylnaphthalenesulfonates, alkylphenol polyglycol ether sulfates, fatty alcohol polyglycol ether sulfates, fatty acid amide polyglycol ether sulfates, alkylsulfosuccinamates, alkenylsuccinic monoesters, fatty alcohol polyglycol ether sulfosuccinates, alkanesulfonates, fatty acid glutamates, alkylsulfosuccinates, fatty acid sarcosides; fatty acids, examples being palmitic, stearic and oleic acid; the salts of these anionic substances and soaps, examples being alkali metal salts of fatty acids, naphthenic acids and resin acids, abietic acid for example, alkali-soluble resins, rosin-modified maleate resins for example, and condensation products based on cyanuric chloride, taurine, N,N'-diethyl-aminopropylamine and p-phenylenediamine. Preference is given to resin soaps, i.e., alkali metal salts of resin acids.

Examples of suitable cationic substances include quaternary ammonium salts, fatty amine oxalkylates, polyoxyalkyleneamines, oxalkylated polyamines, fatty amine polyglycol ethers, primary, secondary or tertiary amines, examples being alkylamines, cycloalkylamines or cyclized alkylamines, especially fatty amines, diamines and polyamines derived from fatty amines or fatty alcohols, and the oxalkylates of said amines, imidazolines derived from fatty acids, polyaminoamido or polyamino compounds or resins having an amine index of between 100 and 800 mg of KOH per g of the polyaminoamido or polyamino compound, and salts of these cationic substances, such as acetates or chlorides, for example.

Examples of suitable nonionic and amphoteric substances include fatty amine carboxyglycinates, amine oxides, fatty alcohol polyglycol ethers, fatty acid polyglycol esters, betaines, such as fatty acid amide N-propyl betaines, phosphoric esters of aliphatic and aromatic alcohols, fatty alcohols or fatty alcohol polyglycol ethers, fatty acid amide ethoxylates, fatty alcohol-alkylene oxide adducts and alkylphenol polyglycol ethers.

By nonpigmentary dispersants are meant substances which structurally are not derived from organic pigments. They are added as dispersants either during the actual preparation of pigments, but often, also, during the incorporation of the pigments into the application media that are to be colored: for example, during the preparation of varnishes or printing inks, by dispersing the pigments into the corresponding binders. They may be polymeric substances, examples being polyolefins, polyesters, polyethers, polyamides, polyimines, polyacrylates, polyisocyanates, block copolymers thereof, copolymers of the corresponding monomers, or polymers of one class modified with a few monomers from a different class. These polymeric substances carry polar anchor groups such as, for example, hydroxyl, amino, imino and ammonium groups, carboxylic acid and carboxylate groups, sulfonic acid and sulfonate groups or phosphonic acid and phosphonate groups, and may also have been modified with aromatic, nonpigmentary substances. Nonpigmentary dispersants may additionally also be aromatic substances modified chemically with functional groups and not derived from organic pigments. Nonpigmentary dispersants of this kind are known to the skilled worker and in some cases are available commercially (e.g., Solsperse®, Avecia; Disperbyk®, Byk-Chemie; Efka®, Efka). A number of types will be named below, by way of representation, although in principle any desired other substances described can be employed, examples being condensation products of isocyanates and alcohols, diols or polyols, amino alcohols or diamines or polyamines, polymers of hydroxycarboxylic acids, copolymers of olefin monomers or vinyl monomers and ethylenically unsaturated carboxylic acids and carboxylic esters, urethane-containing polymers of ethylenically unsaturated monomers, urethane-modified polyesters, condensation products based on cyanuric halides, polymers containing nitroxyl compounds, polyester amides, modified polyamides, modified acrylic polymers, dispersants with a comblike structure comprising polyesters and acrylic polymers, phosphoric esters, triazine-derived polymers, modified polyethers, or dispersants derived from aromatic, nonpigmentary substances. These parent structures are in many cases modified further, by means for example of chemical reaction with further substances carrying functional groups, or by means of salt formation.

By pigmentary dispersants are meant pigment dispersants which derive from an organic pigment parent structure and are prepared by chemically modifying said parent structure, examples being saccharine-containing pigment dispersants, piperidyl-containing pigment dispersants, naphthalene- or perylene-derived pigment dispersants, pigment dispersants having functional groups which are attached to the pigment parent structure via a methylene group, pigment parent structures chemically modified with polymers, pigment dispersants containing sulfo acid, sulfonamide or sulfo acid ester groups, pigment dispersants containing ether or thioether groups, or pigment dispersants containing carboxylic acid, carboxylic ester or carboxamide groups. It is preferred to use those pigment dispersants which in structural terms derive from organic pigments with an intrinsic yellow color, as the parent structure.

Anionic groups of the nonpigmentary and pigmentary dispersants, surfactants or resins used as auxiliaries may also be present in the form of salts with monovalent, divalent or trivalent ions, and in particular may be laked, using for example Ca, Mg, Ba, Sr, Mn or Al ions or using quaternary ammonium ions.

By fillers and/or extenders are meant a multiplicity of substances in accordance with DIN 55943 and DIN EN 971-1, examples being the various types of talc, kaolin, mica, dolomite, lime, barium sulfate or titanium dioxide. In this context it has proven particularly appropriate to make the addition before the pulverization of the dried pigment preparation.

The invention also provides a process for producing a pigment preparation of the invention, which comprises mixing the pigment dispersant and the monoazo pigment of the formula (I) with one another or causing them to act on one another at any desired point in time during the operation of preparing them.

For example, the dry components in granule or powder form can be mixed before or after any grinding; one component can be added to the other component in moist or dry form, as for example by mixing the components in the form of the moist presscakes.

Mixing can be accomplished by acid pasting, acid swelling, by grinding in dry form, in moist form, by kneading for example, or in suspension, or by a combination of these methods. Grinding may be carried out with the addition of water, solvents, acids or grinding assistants such as salt.

Mixing can also be accomplished by adding the pigment dispersant to the monoazo pigment of the formula (I) during the operation of preparing the monoazo pigment of the formula (I). A preferred operation for preparing the monoazo pigment of the formula (I) is the preparation operation disclosed in EP 894 831 A1 of azo coupling, together where appropriate with a subsequent finish.

Since both components of the pigment preparation of the invention are azo colorants, the preparation can also be accomplished by co-coupling or by azo coupling of one component in the presence of the other component.

The drying of a moist pigment preparation may be carried out using the known drying assemblies, such as drying ovens, bucket-wheel dryers, tumble dryers, contact dryers, and, in particular, spin flash dryers and spray dryers. Through the choice of an appropriate drying assembly it is also possible to produce low-dusting and free-flowing powders or granules.

With preference the pigment preparations are prepared by grinding the components in dry form, in moist form or in suspension, in particular by salt kneading of the components; a further preferred preparation process involves adding the pigment dispersant to the monoazo pigment of the formula (I) during its preparation, in other words before or during or after the azo coupling of the monoazo pigment of the formula (I); or before, during or after a finish of the monoazo pigment of the formula (I). A third preferred preparation variant is that of mixing the two components in dry form prior to pulverization.

The particularly preferred preparation variant is that of salt kneading. For that purpose the crude pigment of the formula (I) is kneaded together with the pigment dispersant of the invention, with an organic liquid and with a crystalline salt, in the form of a kneadable paste of high viscosity. This produces pigment preparations having an average particular size $d_{50}$ below 120 nm, preferably below 100 nm.

Suitable salts are salts of monovalent, divalent or trivalent metal ions, such as alkali metal ions or alkaline earth metal ions, for example, with inorganic acids, such as hydrochloric acid, sulfuric acid or phosphoric acid, or with organic acids having 1 to 6 carbon atoms, examples being formic acid and acetic acid. Preferred salts are sodium formate; sodium or calcium acetate; sodium citrate; potassium sodium tartrate; sodium, potassium, calcium, zinc or aluminum chloride; sodium or aluminum sulfate; calcium carbonate; or mixtures of these salts, and more particularly sodium chloride. The salts are generally used in a fairly large amount- for example, in at least 1 to 10 times, preferably 2 to 8 times, more particularly 3 to 6 times the amount, based on the weight of the monoazo pigment of the formula (I). Even larger amounts can be used, but are uneconomic.

Commercially customary salt may be coarse and may be comminuted by grinding before being used in salt kneading.

The organic liquid is employed in amounts such that the millbase forms a viscous, doughy mass. The amounts employed are between 0.5 to 5 times, preferably between 1 to 2 times, the amount, based on the weight of the monoazo pigment of the formula (I). Suitable organic liquids are those in which the monoazo pigment and the salt are ideally insoluble, and which do not pose a hindrance to the change in crystal phase from alpha to beta. Examples of organic liquids of this kind are alcohols having 1 to 10 C atoms, such as methanol, ethanol, n-propanol, isopropanol, butanols, such as n-butanol, isobutanol, tert-butanol, pentanols, such as n-pentanol, 2-methyl-2-butanol, hexanols, such as 2-methyl-2-pentanol, 3-methyl-3-pentanol, 2-methyl-2-hexanol, 3-ethyl-3-pentanol, octanols, such as 2,4,4-trimethyl-2-pentanol, cyclohexanol; or glycols, such as ethylene glycol, di-, tri- or tetraethylene glycol, propylene glycol, di-, tri- or tetrapropylene glycol, sorbitol or glycerol; polyglycols, such as polyethylene glycols or polypropylene glycols; ethers, such as methyl isobutyl ether, tetrahydrofuran, dimethoxyethane or dioxane; glycol ethers, such as monoalkyl ethers of ethylene glycol or propylene glycol, or diethylene glycol monoalkyl ethers, with alkyl possibly being methyl, ethyl, propyl, and butyl, examples being butyl glycols or methoxybutanol; polyethylene glycol monomethyl ethers, more particularly those having an average molar mass of 350 to 550 g/mol, and polyethylene glycol dimethyl ethers, more particularly those having an average molar mass of 250 to 500 g/mol; ketones, such as acetone, diethyl ketone, methyl isobutyl ketone, methyl ethyl ketone or cyclohexanone; aliphatic acid amides, such as formamide, dimethylformamide, N-methylacetamide or N,N-dimethylacetamide; urea derivatives, such as tetramethylurea; or cyclic carboxamides, such as N-methylpyrrolidone, valerolactam or caprolactam; esters, such as carboxylic acid $C_1$-$C_6$ alkyl esters, such as butyl formate, ethyl acetate or propyl propionate; or carboxylic acid $C_1$-$C_6$ glycol esters; or glycol ether acetates, such as 1-methoxy-2-propyl acetate; or phthalic diesters or benzoic alkyl esters, such as benzoic acid $C_1$-$C_4$ alkyl esters or $C_1$-$C_{12}$ alkyl phthalic diesters; cyclic esters, such as caprolactone; nitriles, such as acetonitrile, aliphatic or aromatic amines, such as dimethylaniline or diethylaniline, for example; unhalogenated or halogenated aliphatic hydrocarbons or aromatic hydrocarbons such as benzine, pinene, carbon tetrachloride, trichloroethylene or tetrachloroethylene, tetrachloroethanes, benzene or alkyl-, alkoxy-, nitro-, cyano- or halogen-substituted benzene, examples being toluene, xylenes, ethylbenzene, anisole, nitrobenzene, chlorobenzene, dichlorobenzenes, trichlorobenzenes, benzonitrile or bromobenzene; or other substituted aromatics, such as phenols, aminophenols, cresols, nitrophenols, phenoxyethanol or 2-phenylethanol; aromatic heterocycles, such as pyridine, morpholine, picoline or quinoline; 1,3-dimethyl-2-imidazolidinone; sulfones and sulfoxides, such as dimethyl sulfoxide and sulfolane, and also mixtures of these organic liquids. Preference is given to glycols and glycol ethers, such as ethylene glycol, diethylene glycol or butyl glycol, amines, such as aniline, diethylaniline, o-toluidine or tallow propylenediamine, dimethylformamide, N-methylpyrrolidone, triethanolamine, toluene, xylene, cumene, mesitylene or octylbenzene. It is possible, but generally not desired, to use a small amount of water, which ought not to be more than 50% by weight of the total liquid, including the water that can be present in the monoazo pigment employed.

For the salt kneading it is also possible to employ acids. Preference is given to using phosphoric acid, carboxylic acids, such as acetic acid, dodecylbenzene-sulfonic acid, and, more particularly, sulfuric acid.

The duration of kneading is guided by the target requirements, and can for example be from 30 minutes to 48 hours or longer; generally it is in the range from 1 to 24 hours, in particular from 2 to 8 hours.

Suitable kneaders include the known continuous and batch kneaders, these being single-arm or multiarm kneaders, preferably two-arm batch kneaders, which exert very high shearing forces on the material being kneaded. Customary blade forms are the double-trough blade (also called sigma blade or Z-blade) or the masticator blade.

The temperature during kneading should be above the melting point and below the boiling point of the organic liquid.

Kneading takes place preferably at a temperature of −20 to 150° C., in particular 50 to 120° C., with from 4 to 6 times the amount of sodium chloride salt, based on the weight of the monoazo pigment, and from 1 to 2 times the amount of diethylene glycol as organic liquid, based on the weight of the monoazo pigment.

In the course of kneading it is possible if necessary to adjust or hold constant the viscous consistency of the material being kneaded, by means of subsequent addition of organic liquid and/or salt. The consistency of the material being kneaded may alter during the kneading operation, as a result for example of evaporation of the organic liquid or as a result for example of the grinding of the monoazo pigment to smaller particle sizes.

Prior to the kneading it is possible in principle to carry out a dry preliminary grinding of monoazo pigment with salt, as is described in EP-A-1 411 091, for example.

The salt used in salt kneading and the organic liquid are typically removed by means for example of an aqueous extraction carried out at acidic pH. This is generally done using acids which accelerate the dissolution of the salt employed, such as hydrochloric, sulfuric or acetic acid, for example. Typically a pH of less than 3 is set, more preferably 1 to 2, or extractive stirring is carried out in 1% to 10% strength by weight acid.

For the extraction it is also possible to add organic solvents.

Extraction can be carried out at any desired temperature, with the proviso that the medium remains liquid, and may even take place above the boiling point of the mixture, where appropriate. Since it is preferred to operate in an aqueous medium, temperatures selected are between 0 and 100° C., more particularly between 60° C. and boiling temperature.

The pigment preparations produced by the process of the invention can be isolated by the customary methods, such as by filtration, decanting or centrifugation, for example. Filtration is preferred. Solvents can also be removed by washing.

The pigment preparation of the invention is employed preferably in a dried solid form, in free-flowing powder consistency, or in the form of granules, or alternatively, for example, as an aqueous presscake.

During salt kneading, during extraction, to the presscake, or else after the drying, it is possible to add the auxiliaries set out above.

The pigment preparations of the invention can be employed for pigmenting high molecular mass organic materials of natural or synthetic origin, such as plastics, resins, varnishes, paints, electrophotographic toners and developers, electret materials, color filters, inks, including printing inks, and seed, for example.

High molecular mass organic materials which can be pigmented with the pigment preparations of the invention are, for example, cellulose compounds, such as, for example, cellulose ethers and cellulose esters, such as ethylcellulose, nitrocellulose, cellulose acetates or cellulose butyrates, natural binders, such as, for example, fatty acids, fatty oils, resins and their conversion products or synthetic resins, such as, for example, polycondensates, polyadducts, addition polymers and copolymers, such as, for example, amino resins, especially urea and melamine formaldehyde resins, alkyd resins, acrylic resins, phenoplasts and phenolic resins, such as novolaks or resols, urea resins, polyvinyls, such as polyvinyl alcohols, polyvinyl acetals, polyvinyl acetates or polyvinyl ethers, polycarbonates, polyolefins, such as polystyrene, polyvinyl chloride, polyethylene or polypropylene, poly (meth)acrylates and copolymers thereof, such as polyacrylic esters or polyacrylonitriles, polyamides, polyesters, polyurethanes, coumarone-indene and hydrocarbon resins, epoxy resins, unsaturated synthetic resins (polyesters, acrylates) with the different cure mechanisms, waxes, aldehyde and ketone resins, gum, rubber and its derivatives and latices, casein, silicones and silicone resins; individually or in mixtures.

It is unimportant whether the aforementioned high molecular mass organic compounds are present in the form of plastic masses or melts or in the form of spinning solutions, dispersions, varnishes, paints or printing inks. Depending on the intended use it proves advantageous to utilize the pigment preparations of the invention in the form of a blend or in the form of prepared products or dispersions.

The present invention further provides a high molecular mass organic material comprising a coloringly effective amount of a pigment preparation of the invention. Based on the high molecular mass organic material it is intended to pigment, the pigment preparation of the invention is employed usually in an amount of 0.01% to 30% by weight, preferably 0.1% to 15% by weight.

The pigment preparations of the invention are also suitable for use as colorants in electrophotographic toners and developers, such as, for example, one- or two-component powder toners (also called one- or two-component developers), magnetic toners, liquid toners, polymerization toners, and specialty toners.

Typical toner binders are addition-polymerization resins, polyaddition resins and polycondensation resins, such as styrene, styrene-acrylate, styrene-butadiene, acrylate, polyester, phenolic-epoxy resins, polysulfones, polyurethanes, individually or in combination, and also polyethylene and polypropylene, which may also include further ingredients, such as charge control agents, waxes or flow assistants, or may be modified subsequently with these added ingredients.

The pigment preparations of the invention are additionally suitable for use as colorants in powders and powder coating materials, particularly in triboelectrically or electrokinetically sprayable powder coating materials which are employed to coat the surfaces of articles made, for example, from metal, wood, plastic, glass, ceramic, concrete, textile material, paper or rubber.

Moreover the pigment preparations of the invention are suitable for use as colorants in ink-jet inks on both an aqueous and a nonaqueous basis, and also in inks which operate in accordance with the hot-melt process.

In the ink-jet inks the pigment preparations of the invention may also be shaded with other colorants, such as organic or inorganic pigments and/or dyes, for example. In this context they are used in ink sets consisting of yellow, magenta, cyan, and black inks, comprising pigments and/or dyes as colorants. In addition they can be used in ink sets which further comprise one or more of the so-called spot colors in the colors, for example, orange, green, blue, gold, and silver. Preference is given in this context to a set of printing inks whose black preparation preferably comprises carbon black as its colorant, more particularly a gas black or furnace black; whose cyan preparation preferably comprises a pigment from the group of the phthalocyanine, indanthrone or triarylcarbonium pigments, more particularly the Colour Index pigment Pigment Blue 15, Pigment Blue 15:1, Pigment Blue 15:2, Pigment Blue 15:3, Pigment Blue 15:4, Pigment Blue 16, Pigment Blue 56, Pigment Blue 60 or Pigment Blue 61; whose magenta preparation preferably comprises a pigment from the group of the monoazo, disazo, β-naphthol, Naphthol AS, laked azo, metal complex, benzimidazolone, anthanthrone, anthraquinone, quinacridone, dioxazine, perylene, thioindigo, triarylcarbonium or diketopyrrolopyrrole pigments, more particularly the Colour Index pigments Pigment Red 2, Pigment Red 3, Pigment Red 4, Pigment Red 5, Pigment Red 9, Pigment Red 12, Pigment Red 14, Pigment Red 38, Pigment Red 48:2, Pigment Red 48:3, Pigment Red 48:4, Pigment Red 53:1, Pigment Red 57:1, Pigment Red 112, Pigment Red 122, Pigment Red 144, Pigment Red 146, Pigment Red 147, Pigment Red 149, Pigment Red 168, Pigment Red 169, Pigment Red 170, Pigment Red 175, Pigment Red 176, Pigment Red 177, Pigment Red 179, Pigment Red 181, Pigment Red 184, Pigment Red 185, Pigment Red 187, Pigment Red 188, Pigment Red 207, Pigment Red 208, Pigment Red 209, Pigment Red 210, Pigment Red 214, Pigment Red 242, Pigment Red 247, Pigment Red 253, Pigment Red 254, Pigment Red 255, Pigment Red 256, Pigment Red 257, Pigment Red 262, Pigment Red 263, Pigment Red 264, Pigment Red 266, Pigment Red 269, Pigment Red 270, Pigment Red 272, Pigment Red 274, Pigment Violet 19, Pigment Violet 23 or Pigment Violet 32; whose yellow preparation preferably comprises a pigment from the group of the monoazo, disazo, benzimidazoline, isoindolinone, isoindoline or perinone pigments, more particularly the Colour Index pigments Pigment Yellow 1, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 81, Pigment Yellow 83, Pigment Yellow 87, Pigment Yellow 97, Pigment Yellow 111, Pigment Yellow 120, Pigment Yellow 126, Pigment Yellow 127, Pigment Yellow 128, Pigment Yellow 139, Pigment Yellow 151, Pigment Yellow 154, Pigment Yellow 155, Pigment Yellow 173, Pigment Yellow 174, Pigment Yellow 175, Pigment Yellow 176, Pigment Yellow 180, Pigment Yellow 181, Pigment Yellow 191, Pigment Yellow 194, Pigment Yellow 196, Pigment Yellow 213 or Pigment Yellow 219; whose orange preparation preferably comprises a pigment from the group of the disazo, β-naphthol, Naphthol AS, benzimidazolone or perinone pigment, more particularly the Colour Index pigments Pigment Orange 5, Pigment Orange 13, Pigment Orange 34, Pigment Orange 36, Pigment Orange 38, Pigment Orange 43, Pigment Orange 62, Pigment Orange 68, Pigment Orange 70, Pigment Orange 71, Pigment Orange 72, Pigment Orange 73, Pigment Orange 74 or Pigment Orange 81; and whose green preparation preferably comprises a pigment from the group of the phthalocyanine pigments, more particularly the Colour Index pigments Pigment Green 7 or Pigment Green 36.

In addition the ink sets may further comprise shading dyes, preferably from the group of C.I. Acid Yellow 17 and C.I. Acid Yellow 23; C.I. Direct Yellow 86, C.I. Direct Yellow 98 and C.I. Direct Yellow 132; C.I. Reactive Yellow 37; C.I. Pigment Yellow 17, C.I. Pigment Yellow 74, C.I. Pigment Yellow 83, C.I. Pigment Yellow 97, C.I. Pigment Yellow 120, C.I. Pigment Yellow 139, C.I. Pigment Yellow 151, C.I. Pigment Yellow 155 and C.I. Pigment Yellow 180; C.I. Direct Red 1, C.I. Direct Red 11, C.I. Direct Red 37, C.I. Direct Red 62, C.I. Direct Red 75, C.I. Direct Red 81, C.I. Direct Red 87, C.I. Direct Red 89, C.I. Direct Red 95 and C.I. Direct Red 227; C.I. Acid Red 1, C.I. Acid Red 8, C.I. Acid Red 80, C.I. Acid Red 81, C.I. Acid Red 82, C.I. Acid Red 87, C.I. Acid Red 94, C.I. Acid Red 115, C.I. Acid Red 131, C.I. Acid Red 144, C.I. Acid Red 152, C.I. Acid Red 154, C.I. Acid Red 186, C.I. Acid Red 245, C.I. Acid Red 249 and C.I. Acid Red 289; C.I. Reactive Red 21, C.I. Reactive Red 22, C.I. Reactive Red 23, C.I. Reactive Red 35, C.I. Reactive Red 63, C.I. Reactive Red 106, C.I. Reactive Red 107, C.I. Reactive Red 112, C.I. Reactive Red 113, C.I. Reactive Red 114, C.I. Reactive Red 126, C.I. Reactive Red 127, C.I. Reactive Red 128, C.I. Reactive Red 129, C.I. Reactive Red 130, C.I. Reactive Red 131, C.I. Reactive Red 137, C.I. Reactive Red 160, C.I. Reactive Red 161, C.I. Reactive Red 174 and C.I. Reactive Red 180.

Ink-jet inks generally contain a total of 0.5% to 15% by weight, preferably 1.5% to 8% by weight (reckoned on a dry basis), of the pigment preparation of the invention.

Microemulsion inks are based on organic solvents, water, and, where appropriate, an additional hydrotropic substance (interface mediator). Microemulsion inks contain generally 0.5% to 15% by weight, preferably 1.5% to 8% by weight, of the pigment preparation of the invention, 5% to 99% by weight of water, and 0.5% to 94.5% by weight of organic solvent and/or hydrotropic compound.

"Solvent based" ink-jet inks contain preferably 0.5% to 15% by weight of the pigment preparation of the invention, 85% to 99.5% by weight of at least one organic solvent and/or hydrotropic compounds.

Hot-melt inks are based usually on waxes, fatty acids, fatty alcohols or sulfonamides which are solid at room temperature and liquefy on heating, the preferred melting range being between about 60° C. and about 140° C. Hot-melt ink-jet inks are composed, for example, essentially of 20% to 90% by weight of wax and 1% to 10% by weight of the pigment preparation of the invention. They may further include 0 to 20% by weight of an additional polymer (as "dye dissolver"), 0 to 5% by weight of dispersing assistant, 0 to 20% by weight of viscosity modifier, 0 to 20% by weight of plasticizer, 0 to 10% by weight of tack additive, 0 to 10% by weight of transparency stabilizer (which prevents, for example, crystallization of the waxes), and 0 to 2% by weight of antioxidant.

Additionally the pigment preparations of the invention are also suitable for use as colorants for color filters, both for additive and for subtractive color generation, such as, for example, in electrooptical systems such as television screens, LCDs (liquid crystal displays), charge-coupled devices, plasma displays or electroluminescent displays, which may in turn be active (twisted nematic) or passive (supertwisted nematic) ferroelectric displays or light-emitting diodes, and also as colorants for electronic inks (or e-inks) or electronic paper (e-paper). In the production of color filters, both reflective and transparent color filters, pigments are applied in the form of a paste or as pigmented photoresists in suitable binders (acrylates, acrylic esters, polyimides, polyvinyl alcohols, epoxides, polyesters, melamines, gelatins, caseins) to the respective LCD components (e.g., TFT-LCD-Thin Film Transistor Liquid Crystal Displays or, e.g., ((S) TN-LCD-(Super) Twisted Nematic-LCD). Besides high thermal stability, high pigment purity is a prerequisite for a stable paste and/or a pigmented photoresist. Furthermore, the pigmented color filters can also be applied by ink-jet printing processes or other suitable printing processes.

The yellow hues of the pigment preparations of the invention are highly suitable for the shading, particularly of the red and green hues, of the color filter color set red-green-blue (R, G, B). These three colors are present as separate color points alongside one another, and when backlit produce a full-color image.

Typical colorants for the red color point are pyrrolopyrrole, quinacridone and azo pigments, such as P.R. 254, P.R. 209, P.R. 175 and P.O. 38, for example, individually or mixed.

For the green color point, phthalocyanine colorants are typically employed, such as P.G. 36 and P.G. 7, for example.

For the blue color point, use is made typically of unhalogenated phthalocyanine colorants or phthalocyanine colorants with only low levels of halogenation, such as P.B. 15:6, for example.

As and when required, the respective color points may also be admixed with further colors for the purpose of shading.

The invention further provides color filters comprising a coloringly effective amount of a pigment preparation of the invention.

It was surprising and unforeseeable that the pigment preparations of the invention surpass the properties of the known monoazo pigments of the formula (I).

The pigment preparations of the invention are notable for their outstanding coloristic and rheological properties, particularly their high flocculation stability, ready dispersibility, good rheology, high color strength, transparency, and saturation (chroma). In numerous application media they can be dispersed easily and up to high finenesses. Pigment dispersions of this kind exhibit outstanding rheological properties even at high levels of pigmentation of the paint or printing-ink concentrates. Other properties too, such as gloss, fastness to overcoating, solvent fastness, alkali and acid fastness, light and weather fastnesses, and high cleanness of hue, for example, are very good.

The pigment preparations of the invention can be employed to outstanding effect in color filters. There they ensure high contrast and also satisfy the other requirements imposed in the case of color filter use, such as high temperature stability or steep and narrow absorption bands. They are also suitable, for example, for ink-jet applications, by virtue of their high color strength, and by virtue of the high storage stability at low viscosity of the ink-jet ink, which does not clog the nozzles and which exhibits high transparency.

With regard to the color filter materials there are very particular requirements imposed on the colorants employed.

The Principal Technical Parameters which Must be Met are as Follows:
- high thermal stability: during the manufacturing operation of a color filter, the individual applied layers are heated, so that pigment preparation must withstand temperatures up to 300° C. for up to 1 hour;
- ready dispersibility in color filter systems;
- steep and narrow absorption bands of each applied color filter layer;
- high contrast;
- high and stable viscosity in the color filter medium: too high a viscosity prevents the liquid being distributed uniformly on the glass substrate and detracts, as a result, from the quality of the image;
- ecotoxicological benignancy in processing;
- nonflocculating behavior;
- a very smooth (not rough) surface of the applied (pigmented) color filters;
- acid resistance (for etching processes, for example);
- solvent fastness.

In order to assess the properties of the pigment preparation in the paint sector, in water-free, solvent-based varnish systems, a selection was made, from among the multiplicity of known varnishes, of an alkyd-melamine resin varnish based on a medium-oil alkyd resin and on a butanol-etherified melamine resin (AM).

The viscosity was determined following dilution of the millbase to the final pigment concentration, using the Rossman viscospatula type 301 from Erichsen.

In the examples which follow, parts and percentages are by weight unless indicated otherwise.

EXAMPLE 1

450 g of micronized sodium chloride, 75 g of pigment of the formula (I) prepared in accordance with Example 1 of EP-A-0 894 831, 3.9 g of pigment dispersant prepared in analogy to EP-A-0 076 024, Example 1 by co-coupling of one molar fraction of acetoacetanilide and one molar fraction of acetoacet-4-sulfanilide with one molar fraction of the hydrochloride of the bis-diazonium salt of dichlorobenzidine and subsequent reaction with dioctadecyldimethylammonium chloride, and 115 ml of diethylene glycol are kneaded in a kneader with sigma blades at 40° C. for 8 hours. The kneaded material is stirred in 4 liters of 5% strength by weight sulfuric acid at 40° C. for 2 hours, the suspension is filtered with suction, and the presscake is washed salt-free with water and dried at 80° C. This gives 75 g of inventive pigment preparation.

EXAMPLE 2

450 g of micronized sodium chloride, 75 parts of pigment of the formula (I) prepared in accordance with Example 1 of EP-A-0 894 831, and 115 ml of diethylene glycol are kneaded in a kneader with sigma blades at 40° C. for 8 hours. The kneaded material is stirred in 4 liters of 5% strength by weight sulfuric acid at 40° C. for 2 hours, the suspension is filtered with suction, and the presscake is washed salt-free with water and dried at 80° C. This gives 75 g of pigment granules. 50 g of the pigment granules are dry-pulverized with 5 g of pigment dispersant prepared in analogy to EP-A-0 076 024, Example 1 by co-coupling of one molar fraction of acetoacetanilide and one molar fraction of acetoacet-4-sulfanilide with one molar fraction of the hydrochloride of the bis-diazonium salt of dichlorobenzidine and subsequent reaction with dioctadecyldimethylammonium chloride

EXAMPLE 3

1125 g of micronized sodium chloride, 187.5 g of pigment of the formula (I) prepared in accordance with Example 1 of EP-A-0 894 831, 9.4 g of pigment dispersant prepared in analogy to EP-A-0 076 024, Example 1 by co-coupling of one molar fraction of acetoacetanilide and one molar fraction of acetoacet-4-sulfanilide with one molar fraction of the hydrochloride of the bis-diazonium salt of dichlorobenzidine and subsequent reaction with dioctadecyldimethylammonium chloride, 9.4 g of a dispersing assistant, and 310 ml of diethylene glycol are kneaded in a kneader with sigma blades at 85° C. for 8 hours. The kneaded material is stirred in 10 liters of 5% strength by weight sulfuric acid at 40° C. for 2 hours, the suspension is filtered with suction, the presscake is washed salt-free with water and dried at 80° C., and the granules are pulverized. This gives 185 g of pigment preparation.

Testing of Coloristic Properties of the Pigment Preparations:

Determination of Color Strength, Purity, and Lightness:

To determine the color strength, the purity, and the lightness, 1 part of each pigment preparation is mixed with 9 parts of an aqueous base varnish system and then dispersed. In a white reduction, 2 parts of each resultant grinding mixture are homogenized with 100 parts of a standard white dispersion and drawn down onto a test chart. Subsequently the coloristic properties (color strength, purity, and lightness) are determined using a CM-3700d spectrophotometer from Minolta.

Determination of Transparency:

To determine the transparency, 4 parts of each grinding mixture are homogenized with 9 parts of distilled water and 7 parts of an acrylate varnish and drawn down onto a test chart. The transparency is then assessed visually.

The standard employed for the color strength, the purity difference dC, the lightness difference dL, and the transparency was the pigment prepared in accordance with Example 1 of EP-A-0 894 831.

The inventive pigment preparations obtained in Examples 1, 2, and 3 are distinguished by very high color strength, by a pure and light hue, and by a high transparency. The inventive pigment preparation of Example 1 exhibits, relative to the standard, a significantly higher color strength and a markedly higher transparency.

Production of Colorant Formulations:

The inventive pigment preparation, either as a powder or as a presscake, is pasted up in deionized water together with the aforementioned dispersants, the organic solvent, and the other additives, and then the paste is homogenized and pre-dispersed using a dissolver. Subsequent fine dispersion takes place using a bead mill over a period 3 hours with cooling. The dispersion is subsequently adjusted with deionized water to the desired final pigment concentration.

The colorant formulations described in the examples which follow were produced by the method described above, using the following constituents in the stated amounts such that 100 parts of the respective colorant formulation are formed, parts being by weight.

EXAMPLE A

Comparative Example

| | |
|---|---|
| 20 parts | pigment of the formula (I) prepared in accordance with Example 1 of EP 894 831 A1 |
| 2.5 parts | acrylate resin, Na salt (dispersant) |
| 1.2 parts | polyethylene glycol alkyl ether, Na salt (dispersant) |
| 7.5 parts | propylene glycol |
| 0.2 part | preservative |
| remainder | water |
| particle size $d_{50}$: 142 nm. | |

EXAMPLE B

The colorant formulation was produced in the same way as in Example A, using the inventive pigment preparation from Example 1 in place of the pigment of the formula (I). Particle size $d_{50}$: 80 nm.

EXAMPLE C

The colorant formulation was produced in the same way as in Example A, using the inventive pigment preparation from Example 2 in place of the pigment of the formula (I).

EXAMPLE D

The colorant formulation was produced in the same way as in Example A, using the inventive pigment preparation from Example 3 in place of the pigment of the formula (I).

Assessment of Printing Properties:

To assess the printing properties, test inks were prepared from the colorant formulations of Examples B to D and were investigated for their printability using a thermal ink-jet printer.

The test inks were prepared by first finely filtering the colorant formulations through a 1 μm filter to remove grinding media attritus and any coarse fractions. Thereafter the filtered colorant formulations were diluted with water and admixed with further low molecular mass alcohols and polyols, the pigment content being adjusted to 5% by weight relative to the ink (100% by weight). An HP 960C printer (Hewlett Packard) was used to print test images on commercially customary standard papers (copy ink papers) and specialty papers (premium quality) from Hewlett Packard. Assessment in terms of the quality and grade of the printed image was made by means of visual inspection.

Assessment of Optical Density:

To assess the optical density, the test inks were printed solidly onto uncoated paper from DataCopy, using the HP 960C printer (Hewlett Packard), and the optical density was measured by means of a Gretag MacBeth spectrophotometer.

Gloss Measurement:

To measure the gloss, the test inks were printed solidly onto premium glossy paper from Epson, using the HP 960C printer (Hewlett Packard), and the gloss was measured at 20° and 60° angles using a gloss meter from Byk Gardner.

The test inks prepared from the colorant formulations of Examples B to D possess very low viscosity and exhibit very good printing characteristics. The results include in particular the high reliability of the respective test ink in the course of printing (very good start-of-print behavior, no nozzle clogging) and a very uniform printed image of excellent quality on the various papers used. Prints produced on plain (uncoated) paper with the test inks prepared from the colorant formulations of Examples B to D exhibit a high optical density as compared with the standard, and a very high gloss on premium glossy paper.

Testing for Color Filters:

First of all a color filter paste is prepared. It is composed of pigment composition, binder, solvent and dispersing assistant.

Formula:

73 g of propylene glycol monoethylene ether acetate (PGMEA) are spread with 17 g of dispersant.

The mixture is shaken in a paint shaker for 10 minutes.

Addition of 10 g of pigment preparation from Example 1, 2 or 3.

The mixture is shaken for 10 minutes in a paint shaker.

The above mixture is admixed with zirconium beads (Ø 0.3 mm).

The mixture is shaken for 3 hours in a paint shaker.

The dispersion is subsequently filtered.

The viscosity of the dispersion is determined using a rotational viscosimeter at a temperature of 23° C.±0.5° C. and at a shear rate of 250 s$^{-1}$.

30 g of a varnish mixture (90% PGMEA and 10% resin) are combined with 20 g of the above dispersion.

The resulting color filter paste is applied by spin coater to a glass substrate to produce a color filter film. The transparency, coloristic values, heat stability, and contrast are determined on this color filter film.

The transmittance of the coated glass substrate is determined spectrophotometrically in the use range of 400-700 nm; the coloristic values are described using the CIE color triangle x, y, Y values): x here describes the blue-red axis, y the blue-green axis, and Y the brightness.

Following the transmittance measurement, the coated glass substrate is heated at 80° C. for 10 minutes. Thereafter the transmittance and the x, y, Y values are measured. The coated glass substrate is then heated at 250° C. for 1 hour, and the transmittance and the x, y, Y values are determined again.

Furthermore, using the color filter paste, a masstone drawdown and, after dilution with white paste, a white reduction drawdown are prepared by knife coating, and their coloristic properties are assessed.

Results:

Testing for color filters with the pigment preparations of Example 1, 2 and 3.

Dispersion Viscosity:

| Ex. 1 | Ex. 2 | Ex. 3 |
|---|---|---|
| 4 mPas | 4 mPas | 5 mPas |

The drawdowns exhibit high transparency and color strength and a pure hue.

Then 3 ml of the color filter paste are pipetted and applied to a glass substrate by means of a spin coater at a rotary speed of 350 rpm for 20 seconds. The coloristic properties of the color filter film are then determined spectrophotometrically.

x, y, Y Values at 80° C.:

|  | Ex. 1 | Ex. 2 | Ex. 3 |
|---|---|---|---|
| x value | 0.4003 | 0.4093 | 0.4086 |
| y value | 0.4595 | 0.4681 | 0.4707 |
| Y value | 83.84 | 82.17 | 83.08 |

Transmittance Values 80° C. at 400-700 Nm:

Color Filters with Pigment Preparation from Example 1:

| 400 nm | 410 nm | 420 nm | 430 nm | 440 nm | 450 nm | 460 nm | 470 nm | 480 nm | 490 nm | 500 nm |
|---|---|---|---|---|---|---|---|---|---|---|
| 1.964 | 2.582 | 3.989 | 6.473 | 10.582 | 16.907 | 25.896 | 37.085 | 50.627 | 64.967 | 77.197 |
| 510 nm | 520 nm | 530 nm | 540 nm | 550 nm | 560 nm | 570 nm | 580 nm | 590 nm | 600 nm | 610 nm |
| 84.613 | 87.483 | 88.068 | 88.182 | 88.486 | 89.262 | 90.279 | 91.266 | 92.023 | 92.336 | 92.291 |
| 620 nm | 630 nm | 640 nm | 650 nm | 660 nm | 670 nm | 680 nm | 690 nm | 700 nm | | |
| 91.899 | 91.333 | 90.773 | 90.359 | 90.176 | 90.170 | 90.334 | 90.550 | 90.654 | | |

Color Filters with Pigment Preparation from Example 2:

| 400 nm | 410 nm | 420 nm | 430 nm | 440 nm | 450 nm | 460 nm | 470 nm | 480 nm | 490 nm | 500 nm |
|---|---|---|---|---|---|---|---|---|---|---|
| 1.755 | 2.145 | 3.087 | 4.901 | 7.971 | 13.026 | 20.799 | 31.229 | 44.412 | 58.656 | 71.518 |
| 510 nm | 520 nm | 530 nm | 540 nm | 550 nm | 560 nm | 570 nm | 580 nm | 590 nm | 600 nm | 610 nm |
| 80.702 | 85.835 | 87.999 | 88.474 | 88.321 | 88.287 | 88.562 | 88.240 | 90.193 | 91.153 | 91.855 |
| 620 nm | 630 nm | 640 nm | 650 nm | 660 nm | 670 nm | 680 nm | 690 nm | 700 nm | | |
| 92.162 | 92.099 | 91.714 | 91.197 | 90.628 | 90.111 | 89.720 | 89.517 | 89.374 | | |

Color Filters with Pigment Preparation from Example 3:

| 400 nm | 410 nm | 420 nm | 430 nm | 440 nm | 450 nm | 460 nm | 470 nm | 480 nm | 490 nm | 500 nm |
|---|---|---|---|---|---|---|---|---|---|---|
| 1.161 | 1.479 | 2.225 | 3.941 | 7.010 | 12.242 | 20.485 | 31.560 | 45.789 | 61.621 | 75.356 |
| 510 nm | 520 nm | 530 nm | 540 nm | 550 nm | 560 nm | 570 nm | 580 nm | 590 nm | 600 nm | 610 nm |
| 83.302 | 86.087 | 86.931 | 87.791 | 89.110 | 90.547 | 91.536 | 91.862 | 91.617 | 91.014 | 90.454 |
| 620 nm | 630 nm | 640 nm | 650 nm | 660 nm | 670 nm | 680 nm | 690 nm | 700 nm | | |
| 90.170 | 90.248 | 90.646 | 91.283 | 92.007 | 92.500 | 92.615 | 92.398 | 91.751 | | |

The heat stability is good in all three examples.

The invention claimed is:

1. A pigment preparation comprising the monoazo pigment of the formula (I)

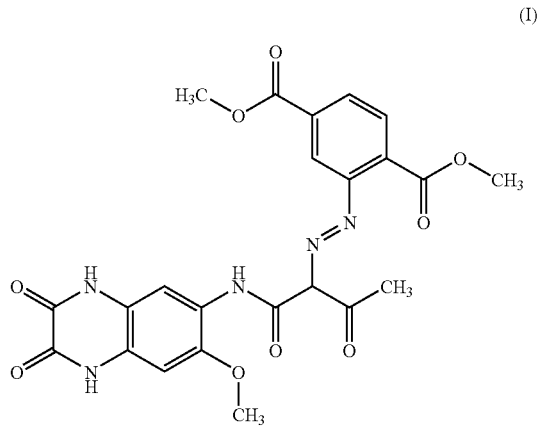

and a pigment dispersant in an amount of 0.1% to 40% based on the weight of the monoazo pigment of the formula (I), wherein the pigment dispersant is composed of disazo compounds, at least 30% by weight of the disazo compounds constituting an asymmetric disazo compound of the formula (II)

 Y—X-A-X—Z (II), wherein
- A is biphenylene, 3,3'-dichlorobiphenylene, 3,3'-dimethoxybiphenylene, 3,3'-dimethylbiphenylene or 2,2'-dichloro-3,3'-dimethoxybiphenylene;
- X is a group —NH—CO—CH(COCH₃)—N═N—,—N═N—CH(COCH₃)—CO—NH— or —N═N—;
- Y is substituted or unsubstituted phenyl, pyrazolin-5-on-4-yl, 1-phenyl-pyrazolin-5-on-4-yl, 2-hydroxynaphth-1-yl or 2-hydroxy-3-(phenylamino-carbonyl)naphth-1-yl, the substituents being C₁-C₄ alkyl, C₁-C₄ alkoxy, nitro, halogen or C₁-C₄ alkoxycarbonyl, and
- Z has the definition of Y and is additionally substituted by a sulfonic acid group in the form of the ammonium salt.

2. The pigment preparation as claimed in claim 1, wherein the pigment dispersant is present in an amount of 0.5% to 25% by weight, based on the weight of the monoazo pigment of the formula (I).

3. The pigment preparation as claimed in claim 1, wherein the asymmetric disazo compound of the formula (II) makes up 40% to 60% by weight of the disazo compounds.

4. The pigment preparation as claimed in claim 1, wherein A is 3,3'-dichlorobenzidine.

5. The pigment preparation as claimed in claim 1, wherein Y is phenyl and X is —NH—CO—CH(COCH₃)—N═N— or —N═N—CH(COCH₃)—CO—NH—.

6. The pigment preparation as claimed in claim 1, wherein Z is 4-sulfophenyl and X is —NH—CO—CH(COCH₃)—N═N— or —N═N—CH(COCH₃)—CO—NH—.

7. The pigment preparation as claimed in claim 1, wherein
- A is 3,3'-dichlorobenzidine,
- Y is phenyl,
- X is —NH—CO—CH(COCH₃)—N═N— or —N═N—CH(COCH₃)—CO—NH—,
- Z is 4-sulfophenyldioctadecyldimethylammonium.

8. A process for producing a pigment preparation as claimed in claim 1 comprising the step of mixing the pigment dispersant and the monoazo pigment of the formula (I) with one another or they are caused to act on one another at any desired point in time during the process of preparing the pigment dispersant, the monoazo pigment or both.

9. The process as claimed in claim 8, wherein the pigment of the formula (I) is a coarse pigment, and the pigment dispersant and the coarse pigment are kneaded with a crystalline salt and an organic liquid in the form of a highly viscous paste.

10. A high molecular mass organic material of natural or synthetic origin pigmented with the pigment preparation according to claim 1, wherein the high molecular mass organic material of natural or synthetic origin is selected from the group consisting of electrophotographic toners, electrophotographic developers, electret materials, color filters, inks, printing inks, and seed.

11. A high molecular mass organic material comprising a coloringly effective amount of a pigment preparation as claimed in claim 1.

12. A color filter comprising a coloringly effective amount of a pigment preparation as claimed in claim 1.

13. The pigment preparation as claimed in claim 1, wherein the pigment dispersant is present in an amount between 1.0% to 17.5% by weight, based on the weight of the monoazo pigment of the formula (I).

* * * * *